United States Patent [19]

Shoji

[11] Patent Number: 4,514,647
[45] Date of Patent: Apr. 30, 1985

[54] CHIPSET SYNCHRONIZATION ARRANGEMENT

[75] Inventor: Masakazu Shoji, Warren, N.J.

[73] Assignee: AT&T Bell Laboratories, Murray Hill, N.J.

[21] Appl. No.: 519,495

[22] Filed: Aug. 1, 1983

[51] Int. Cl.³ ...................... H03K 5/135; H03K 5/14; H03K 5/12; H03K 3/86

[52] U.S. Cl. ................................... 307/269; 307/601; 307/603; 307/605; 307/608

[58] Field of Search ............... 307/262, 265, 268, 269, 307/591, 594, 595, 597, 601, 602, 603, 605, 608; 328/63; 377/104, 105; 364/200 MS File

[56] References Cited

U.S. PATENT DOCUMENTS 3,440,452 4/1969 Boehm ............................ 307/269 X
3,725,793 4/1973 Phillips ........................... 307/269 X
3,755,748 8/1973 Carlow et al. .................. 307/269 X
3,778,784 12/1973 Karp et al. ...................... 307/262 X
3,986,046 10/1976 Wunner ......................... 307/269 X
4,021,784 5/1977 Kimlinger ........................... 364/200
4,122,361 10/1978 Clemen et al. ................. 307/269 X
4,379,974 4/1983 Plachno .............................. 307/269

Primary Examiner—Larry N. Anagnos
Attorney, Agent, or Firm—Herbert M. Shapiro

[57] ABSTRACT

Each chip of a microprocessor chipset is synchronized by an associated controller which adjusts a control signal for controlling the delay of a variable delay circuit during each operating cycle. The controller tailors the control signal for each chip by an op-amp which compares the output of an internal clock in each chip with a reference system clock.

9 Claims, 8 Drawing Figures

FIGS. 3, 5 and 7 are plots of clock pulses supplied by the circuits of FIGS. 2, 6 and 4, respectively.

CHIPSET SYNCHRONIZATION ARRANGEMENT

FIELD OF THE INVENTION

This invention relates to semiconductor, integrated circuit (IC) chips and, more particularly, to a set of chips operating in a system and requiring synchronization for proper operation.

BACKGROUND OF THE INVENTION

As is well known, microprocessors often are defined in a single semiconductor chip comprising an arrangement of electronic components defining control, logic and datapath portions. The latter portion includes a central processing unit (CPU) in which data is processed under the control of the control portion. Frequently the CPU along with limited datapath and control functions, is defined on a separate chip linked into a system with other chips to form a microprocessor chipset. Each of these other chips also includes an arrangement of electronic components which may perform a different function such as system input-output (I/O), direct memory access (DMA) control, interrupt and memory management (MMU), many of which functions could have been incorporated into a single microprocessor chip of limited capability. The chips cooperate to provide an augmented capability when compared to such a single microprocessor chip.

As is the case with the synchronization of the various functional components on a single chip, the components of all the chips in a chipset must be synchronized as well. A separate clock chip provides clock pulses for synchronizing the various components in the several chips. But, inside each chip, skew still frequently occurs in the clock pulses due to capacitive loading and similar effects as is well understood. Because such skew makes the time reference of each chip different, skew results in a lowering of frequency of operation of the chipset.

Efforts have been made to reduce clock pulse skew in chipsets. In one instance, different voltage levels are provided to different chips. The different voltage levels produce different currents which change the switching speeds in the different chips. But this expedient requires additional circuitry and results in undesirable changes in the operating parameters of the various chips.

BRIEF DESCRIPTION OF THE INVENTION

In accordance with the present invention, each chip of a chipset includes an arrangement of adjustable delay circuits which is operative to adjust the rising and falling edges of internal clock pulses. Each arrangement of adjustable delay circuits is responsive to a control signal for synchronizing the edges of the clock pulses in the various chips. A controller comprises a separate control signal generating circuit for each chip of the set. Each control signal generating circuit is responsive to a system clock pulse and to an internal clock pulse from the associated chip, acting in each instance to adjust the delay of the next timing pulse in the associated chip.

DETAILED DESCRIPTION

Figure 1:
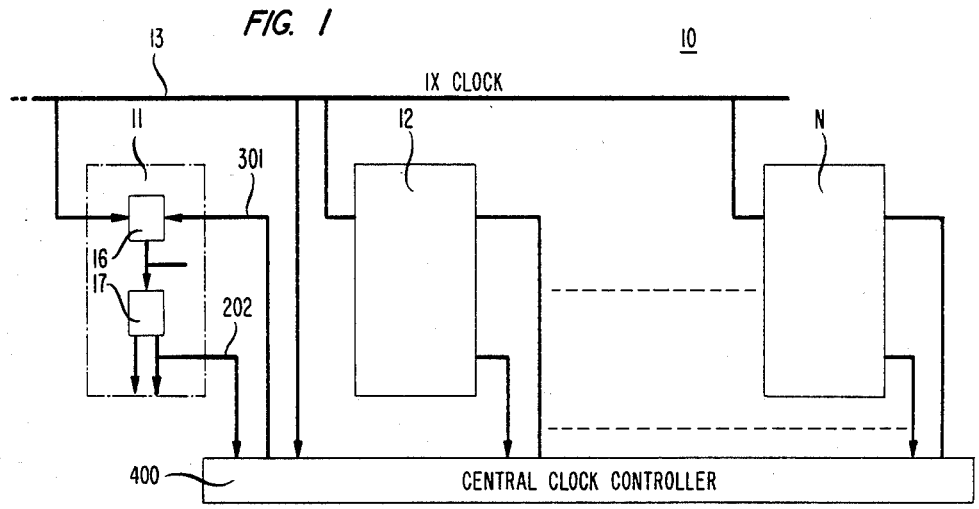
FIG. 1 is a schematic representation of a system clock distribution arrangement in accordance with this invention.

FIG. 1 shows a representation of a chipset 10 comprising individual chips 11, 12, . . . N, supplied with clock pulses from a clock pulse distribution line 13. Chip 11 might comprise a central processor unit (CPU), chip 12 might comprise a memory management unit (MMU), and chip N might comprise a direct memory access (DMA) controller. A variety of other chips may be present. In order to synchronize components of the various chips of the set which define control, logic and datapath functions, each chip includes an arrangement of adjustable delay circuits represented by rectangular blocks 16 and 17 in FIG. 1.

Each of blocks 16 and 17 includes one or more delay circuits generally of a type described in copending application Ser. No. 452,157, filed Dec. 22, 1982 for R. H. Krambeck and M. Shoji. Block 16 includes a variation of the circuit of FIG. 4; block 17 includes a circuit of the kind shown in FIG. 2 and FIG. 4 and FIG. 6, as will become clear.

Figure 2:
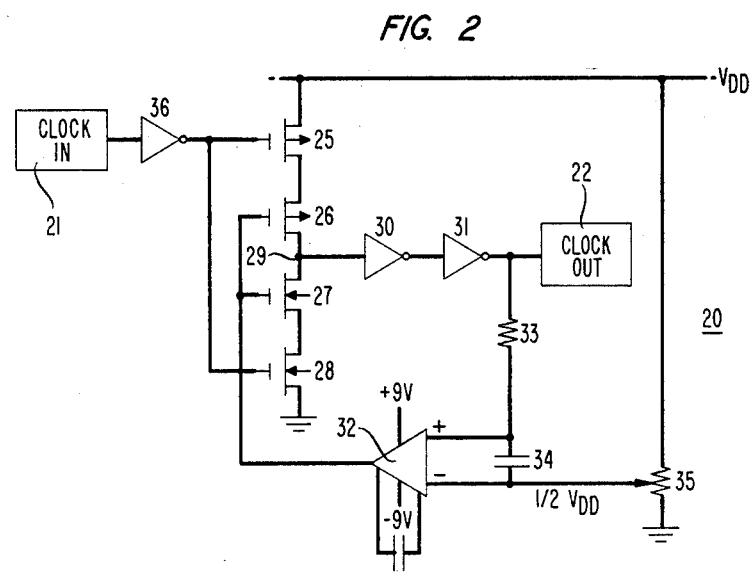
FIGS. 2, 4, 6, and 8 are circuit schematics of portions of the arrangement shown in FIG. 1.

FIG. 2 shows a clock pulse-shaping circuit 20 including clock-in (input) node 21 and clock-out (output) node 22 and is adapted to adjust the duty cycle of a clock-out pulse to exactly the 50 percent point irrespective of the clock-in signal at node 21.

The circuit comprises a series of standard p- and n-channel field effect transistors 25 and 26 and 27 and 28, respectively, connected drain-to-source as shown between a source of voltage $V_{DD}$ and ground. The drain electrodes of transistors 26 and 27 are connected to the clock-out node 22 by means of a series connection of two inverters 30 and 31. The gate electrodes of transistors 26 and 27 are connected to the output of op-amp 32. The positive input to op-amp 32 is connected to node 22 by a resistance 33 of typically 1 Megohm and is loaded typically by a 1000 picofarad capacitance 34. The negative input to op-amp 32 is connected to ground through the center tap of a variable 5000 ohms resistance 35. The gate electrodes of transistors 25 and 28 are connected to the output of inverter 36, the input of which is connected to the clock-in input node 21.

In operation, the DC average voltage at node 22 is compared by op-amp 32 to a reference voltage for generating a control voltage to alter the timing of transitions in the clock-out signal. Specifically, a positive input clock pulse at node 21 is inverted by inverter 36 causing p-channel transistor 25 to switch on and n-channel transistor 28 to switch off. Let us assume, for convenience of explanation, that the output voltage of the op-amp is $\frac{1}{2} V_{DD}$. A reference voltage of $\frac{1}{2} V_{DD}$ is maintained on the negative input of op-amp 32. By adjusting the variable resistor 35, a 50 percent duty cycle output is ensured because the PFET chain comprising transistors 25 and 26 has the capability of pulling up node 29 that is matched to the capability of the NFET chain comprising transistors 27 and 28 of pulling down node 29.

Figure 3:
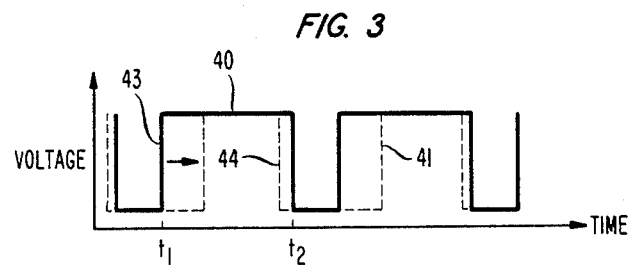

A clock-in signal at node 21, of any duty cycle, is represented by solid curve 40 of FIG. 3. Curve 40 is assumed to have a duty cycle in excess of 50 percent. Consequently, the average DC voltage at node 22 is in excess of $\frac{1}{2} V_{DD}$. Op-amp 32 and the resistor 33 and capacitor 34 are selected to have characteristics such that they do not transmit any clock frequency components but do transmit average DC signals. Since the positive input of op-amp 32 is higher than the negative input, the output of the op-amp approaches $V_{DD}$. The result is that the pull-up of transistor 25 is delayed and the pull-down of transistor 28 is accelerated by an amount dependent on the difference between the average DC voltage and $\frac{1}{2} V_{DD}$. The clock-out signal is represented by broken curve 41 in FIG. 3. This results in a change in the duty cycle as represented by curve 41 appearing at 22 in FIG. 2.

Transitions in the clock signal occur at 43 and 44 such that transition times $t_1$ and $t_2$ satisfy $$t_2 - t_1 = \tfrac{1}{2} \text{ period}.$$

To be exact:

$$(t_2-t_1)_{out} - \tfrac{1}{2}T = \{(t_2-t_1)_{in} - \tfrac{1}{2}T\}/A$$

where T is the period of the input pulse and A=gain of the op-amp regardless of the delay (skew) in the clock-in signal. Experiment has shown that in a range of duty cycles of the input clock, from 10 percent to 80 percent, the output clock duty cycle is locked in at 50 percent.

Figure 4:
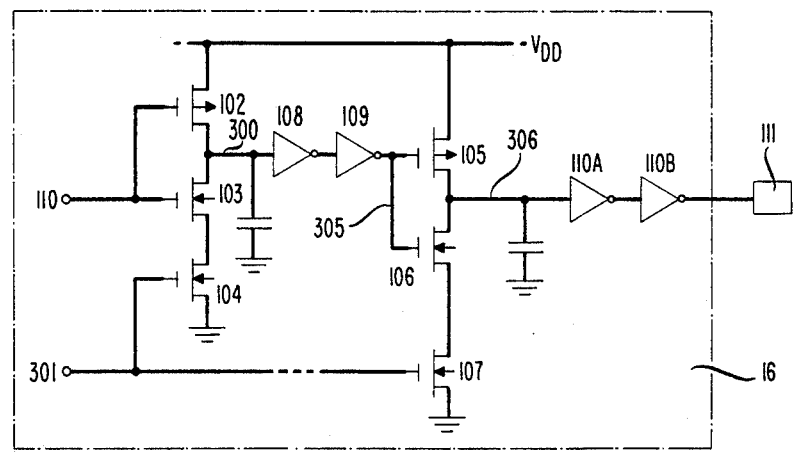

FIG. 4 shows a circuit useful for generating a clock-out signal at a base clock frequency that is delayed by an adjustable amount relative to an input clock signal while retaining the general clock pulse waveform. The clock-out signal is generated in a manner which permits control of the rising and trailing edges of the clock-in signal by the same amount. FIG. 4 shows two sets of p- and n-channel transistors—102, 103 and 104 and 105, 106 and 107—each set being connected electrically in series, source-to-drain as shown, between $V_{DD}$ and ground. Transistors 102 and 105 are standard p-channel field effect transistors; the remaining are n-channel. The gate electrodes of transistors 102 and 103 are connected to an input node 110 and the drain-to-drain connection between transistors 102 and 103 is connected to the gate electrodes of transistors 105 and 106 by means of inverters 108 and 109.

The gate electrodes of transistors 104 and 107 are connected to a source of delay control signals. An output node 111 is connected to the drains of transistors 105 and 106 also via inverters 110A and 110B. The circuit operates as a variable delay. As a circuit variation, provision can be made for applying separate control signals individually to the gate electrodes of transistors 104 and 107, if desired.

Figure 6:
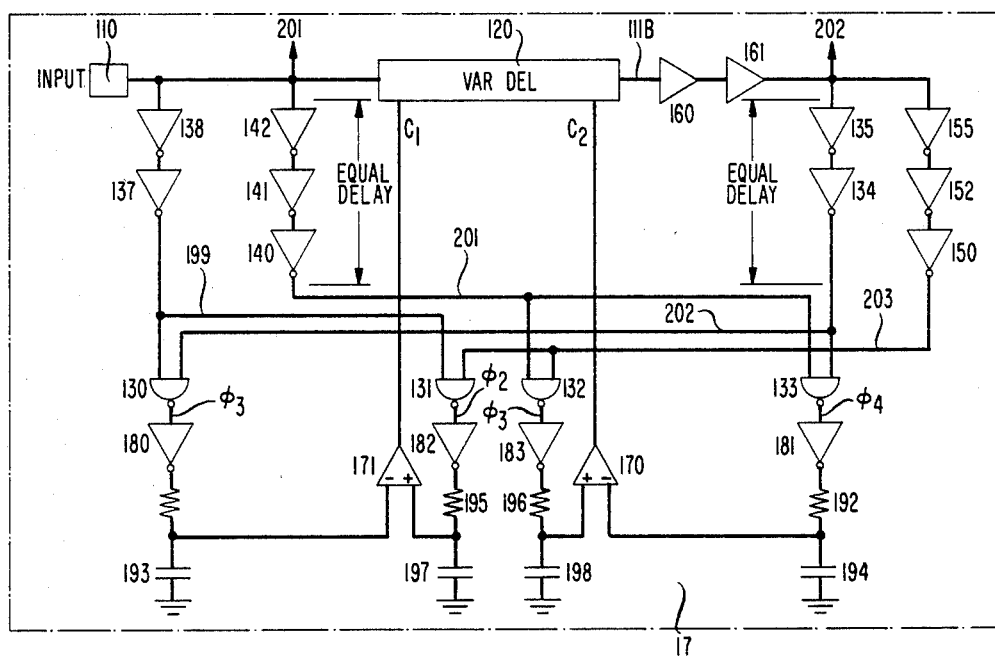

The circuit of FIG. 6 includes four NAND circuits 130, 131, 132 and 133. An input of each of NAND circuits 130 and 133 is connected to the output 111 by means of a series connection of inverters 134 and 135. Similarly, an input of each NAND circuits 130 and 131 is connected to input node 110 via a series connection of inverters 137 and 138. An input to each of NAND circuits 132 and 133 is connected to node 110 via a series arrangement of three inverters 140, 141 and 142. NAND circuits 131 and 132 are connected to output node 111 via a series arrangement of inverters 150, 152 and 155.

A variable delay circuit 120 of the type essentially as represented in FIG. 4 is connected between input node 110 and internal node 111B. Circuit 120 differs from that shown in FIG. 4 only in that the gate electrodes of transistors 104 and 107 are electrically separated to permit separate control signals $C_1$ and $C_2$ to be applied to those electrodes, respectively, as discussed above. A clock-out signal at output node 111 of circuit 120 is applied to the input to inverter 135 via a series arrangement of two inverters 160 and 161. The outputs of first and second op-amps 170 and 171 are connected to the C1 and C2 inputs to circuit 120. The outputs of NAND circuits 130 and 133 are connected to the negative inputs to op-amps 171 and 170, respectively, via associated inverters 180 and 181 and the averaging circuit comprising resistance 191, 192 and capacitor 193 and 194. Similarly, the outputs of NAND circuits 131 and 132 are connected to the positive inputs to op-amps 171 and 170, respectively, via associated inverters 182 and 183 and the averaging circuits comprising resistance 195, 196 and capacitors 197 and 198.

The circuit of FIG. 6 is operative to generate a familiar four-phase pair of clock-out signals of the kind shown in FIG. 5 for electronic components in the associated chip as follows: A series arrangement of two inverters, such as 137 and 138 or 134 and 135 does nothing but delay an input pulse form. A series arrangement of three inverters, such as 140, 141 and 142 or 150, 152 and 155, is designed to provide a pulse of delay equal to the associated arrangement of the two inverters. But the pulse in the latter instance has an opposite polarity. A clock-in pulse at 110 provides a delayed pulse on conductor 199 and an equally delayed pulse of opposite polarity on conductor 201. The result is a positive pulse applied to inputs to NAND circuits 130 and 131 and negative pulse applied to inputs to NAND circuits 132 and 133 at the phases indicated. Similarly, clock-out signal waveform at output node 111 results in equally delayed positive and negative pulses applied to conductors 202 and 203 and thus inputs to NAND circuits 130 and 133 and to NAND circuits 131 and 132, respectively. The output signals from the NAND circuits are applied to inputs to the associated inverters and the averaged DC voltage levels are obtained via the associated resistance-capacitance arrangement to be applied to inputs of the associated op-amps. The output signals from op-amps 170 and 171 are applied as control signals C1 and C2, respectively, to the gate electrodes of transistors 104 and 107 of FIG. 4.

Control signals C1 and C2 are voltage signals of values determined by the difference in the average (DC) voltage of the signal at the outputs in inverters 182 and 180 and inverters 183 and 181 of FIG. 6, respectively. Consider op-amp 170 which generates the C1 control signal. The input signals to op-amp 170 are from NAND circuits 132 and 133. The input signals to NAND circuit 132 are provided, one from the output of inverter 140 (from 110) and one from the output of inverter 150 (from 111). The input signals to NAND circuit 133 are from inverter 134 (from 111) and from inverter 140 (from 110).

Figure 5:
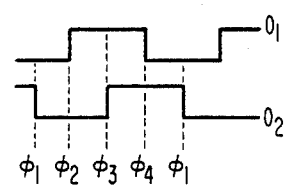

An up-going clock-in signal in FIG. 5 appearing at node 110 of FIG. 6 is operative to turn p-channel transistor 102 OFF and n-channel transistor 103 ON (see FIG. 4). The delay time of the voltage signal on conductor 300 of FIG. 4 depends on the voltage level of control signal C1 which determines how fast the transistor chain comprising FET 103 and 104 discharges conductor 300 in FIG. 4. The result is that the trailing edge of the voltage pulse on conductor 300 (and thus at node 111 of FIG. 4) is delayed an amount determined by the voltage level of control signal C1. Similarly, the response to the down-going edge of a clock-in signal at input node 110 of FIG. 4 is determined by the voltage level of control signal C2 applied to (n-channel) transistor 107 (see FIG. 4).

It should be clear to one skilled in the art that NAND circuits 130, 131, 132 and 133 may be replaced by NOR circuits.

The circuit of FIG. 4 as employed in block 16 in FIG. 1, differs from that which is included in the circuit of FIG. 6 by having the gate of transistors 104 and 107 electrically interconnected as stated hereinbefore. As used in block 16, a common voltage is applied to the two gates. The connection of the gates to a common voltage source provides an advantageous modification of the operation of the circuit of FIG. 4 over and above that exhibited when the gates are electrically connected. Specifically, the interconnection of the gates provides a reciprocal action between the circuits of transistors 102, 103 and 104 of FIG. 4, on the one hand, and the circuit of transistors 105, 106 and 107, on the other, which ensures that the pulse width supplied input at 110 in FIG. 1 remains constant regardless of its delay.

For a DC voltage $V_{DC}$ on conductor 301 of FIG. 4, a pulse at input 110 produces a delay on conductor 300 in the rising edge (low-to-high transition) which is a function of voltage at 301 and a falling edge (high-to-low transition) delay (on conductor 300) which is a constant. For a low DC voltage, the low-to-high transition delay on conductor 300 is large and the high-to-low transition delay is a constant. The operation is due to the portion of the circuit including transistors 102, 103, and 104. The circuit including transistors 105, 106 and 107 operates so that when the DC voltage is high, the low-to-high input transition at node 110 is a constant and the high-to-low transition to the same input 110 is a function of the DC voltage. The overall operation is that the $V_{110}$ (L H) delay $= f_1(V_C) + C$ and $V_{110}$(H L) delay $= C + f_1(V_C)$ and the pulse duration remains constant.

The circuits of FIG. 2 and FIG. 6 (including that of FIG. 4) are represented collectively as block 17 of FIG. 1. The circuit of FIG. 4, as used in block 16 produces the pulse forms of FIG. 7. Specifically, for a constant high DC voltage applied at 301 in FIG. 4 (or FIG. 1) a pulse shown at the top line of FIG. 7 applied at 110 in FIG. 4 produces a delayed fall and rise time as shown in the second line from the top in FIG. 7 at 300. A buffer operates to shorten the fall and rise time of the pulse at node 305 of FIG. 4 as shown in the third line from the top in FIG. 7. The waveform at 306 in FIG. 4 is shown in the fourth line from the top in FIG. 7 squared by a pair of series inverters to the form shown in the fifth line from the top in FIG. 7 as it appears at 111 in FIG. 4.

Figure 7:
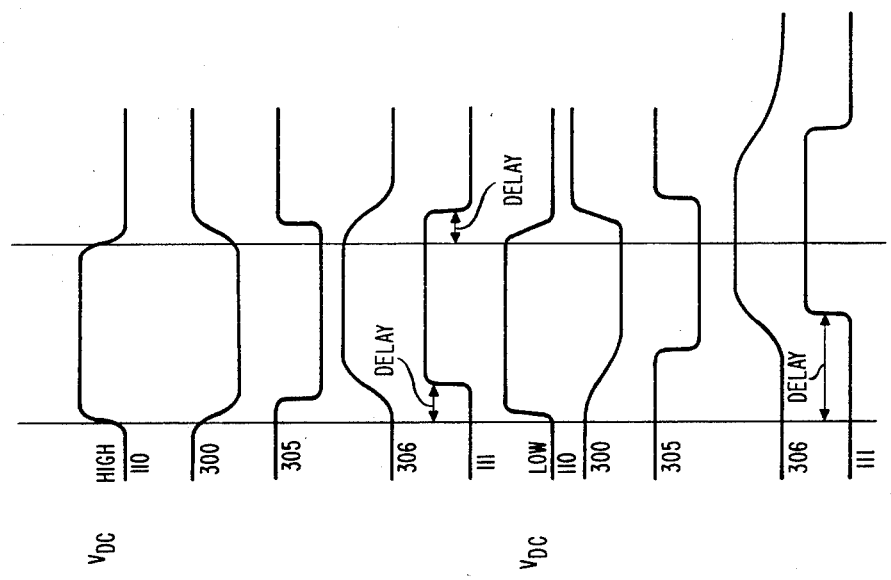

The waveforms for a low DC voltage applied at 301 are shown in the sequence of lines starting at the sixth line down in FIG. 7 and going through the eleventh line down. As can be seen from the FIG. (7), the waveform for a low DC voltage exhibits a relatively slow high-to-low transition leading to a relatively large delay at 111. A similar result occurs at the trailing edge of the waveform at 306 under low DC voltage conditions. As a consequence, the delay of the clock pulse at 111 is increased. Yet the duration of the pulse is invariant.

Figure 8:
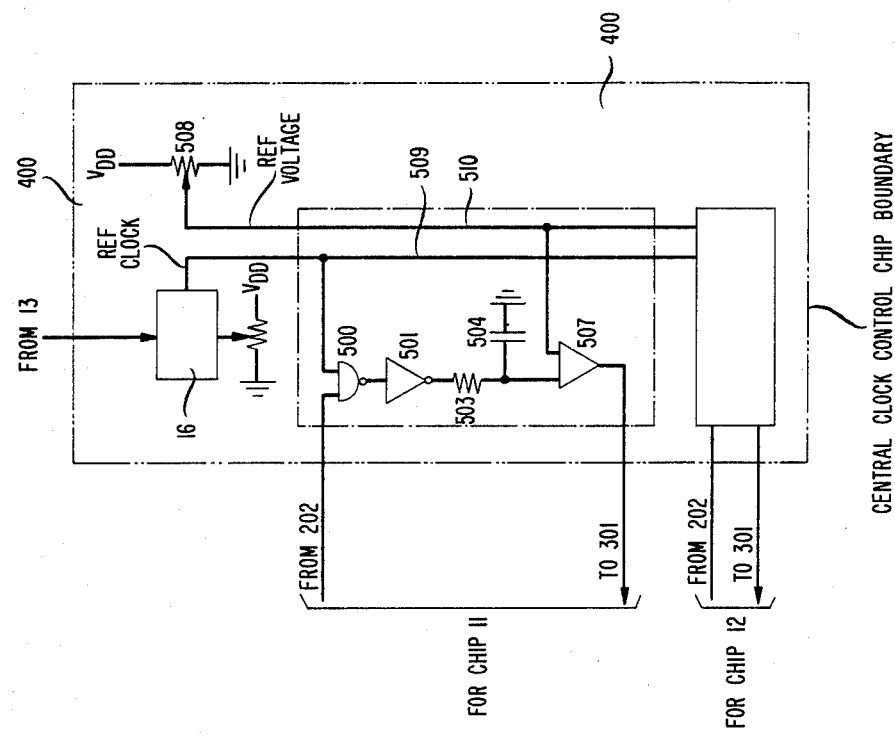

The key to the control and synchronization of the clock pulses is to provide an adjustable delay responsive to the setting of a controller for each chip. The overall system is shown in FIG. 1. The central clock controller 400 for that system is shown in detail in FIG. 8. The circuit includes the circuit of FIG. 4 with the gates of transistors 104 and 107 electrically connected and again designated 16 in FIG. 8. Circuit 16 is operative to produce a reference clock signal at 111 in FIG. 4.

The reference clock signal at the clock-out node of FIG. 4 on conductor 509 (in FIG. 8) is supplied to the controller for each chip of the chipset. The central clock control chip includes one additional circuit (controller) associated with each chip of the chipset in order to supply the control signals. A representative additional circuit associated with chip 11 is shown in detail in FIG. 8. The additional circuit includes a series arrangement of a NAND circuit 500 and an inverter 501 defining an AND circuit 502. The AND circuit is followed by a filter comprising resistor 503 and a capacitor 504 which is connected to ground. The filter is connected to the negative input of an operational amplifier (op-amp) 507. The positive input of the op-amp is connected to a reference voltage less than $V_{DD}$. The reference voltage is supplied in a familiar way by potentiometer 508. The output of the op-amp is applied to conductor 301 of the block 16 of the associated chip.

The reference clock signal for the controllers is common to all the chips of the chipset. Note that the internal clock signal for each chip, appearing on conductor 202 of each chip (see FIG. 6), is applied to one input of NAND circuit 500 of the associated additional circuit of control chip 400. The reference clock signal is applied to the second input to the NAND circuit. The op-amp of the associated additional circuit is responsive to differences between the averages of the reference voltage on conductor 510 and the internal clock signal (smoothed out voltage) of the associated chip in each instance adjustable by a potentiometer to adjust the delay of the clock signal for that chip during the next clock cycle. Of course, the control voltage (on 301) for each chip may be different because the intrinsic delay of the internal clock signal for each chip may be different. The resulting automatic adjustments, on the other hand, result in movement toward synchronization from about 20 percent to 10 percent of the clock period to practically perfect synchronization. The central clock controller can be seen to provide an individual control signal on conductor 301 for each associated chip to adjust the leading edge of the internal clock for that chip so that all the chips are synchronized with respect to the system clock. The internal clock signals for each chip are adjusted for duration in accordance with the teachings of the above-mentioned copending application.

It should be obvious that the details of each of the circuits shown in FIGS. 2, 4, 6 and 8 can be modified in various ways without effecting the function that they achieve and that such modified versions could be substituted in the basic system of FIG. 1 without departing from the spirit of the invention.

What is claimed is:

1. A circuit arrangement for synchronizing clock pulses in a chipset, said chipset comprising at least first and second integrated circuit chips in each of which a plurality of components is defined, each of said chips including an arrangement of adjustable delay circuits for providing internal clock pulses in response to a system clock signal and including control means for adjusting the delay of said internal clock pulses in response to a control signal, said circuit arrangement comprising at least first control signal generating circuits for generating individual control signals for said first and second chips respectively, each of said control signal generating circuits being responsive to said system clock signal and one of said internal clock pulses from an associated one of said first and second chips for adjusting the delay of said internal clock pulses during a next clock cycle.

2. A circuit arrangement in accordance with claim 1 wherein each of said control signal generating circuits includes an op-amp having first and second inputs and an output, first means for applying said internal clock pulse from an associated chip to said first input and second means for applying a system clock pulse to said second input.

3. A circuit arrangement in accordance with claim 2 wherein said first means comprises an AND circuit and a filter.

4. A circuit arrangement in accordance with claim 3 wherein a plurality of said control signal generating circuits is defined in a single integrated circuit controller chip.

5. A circuit arrangement in accordance with claim 4 including a plurality of integrated circuit chips.

6. A circuit arrangement in accordance with claim 1 wherein said arrangement of adjustable delay circuits includes means for adjusting the leading and trailing edges of clock-in pulses applied thereto in response to first and second internal control signals, respectively, and means for providing said first and second internal control signals.

7. A circuit arrangement in accordance with claim 6 wherein said circuit arrangement also includes means for adjusting both the leading and trailing edge of a clock-in pulse applied thereto responsive to each of said individual control signals.

8. A circuit arrangement in accordance with claim 1 wherein said first control signal generating circuits comprise means associated with each of said chips for adjusting leading and trailing edges of a clock-in pulse applied to an associated one of said chips responsive to a system clock signal and one of said internal clock pulses applied thereto from said associated chip.

9. A circuit arrangement in accordance with claim 1 including a plurality of means each associated with a different one of said chips and receiving an internal clock pulse from said associated chip, each of said plurality of means being operative to adjust the leading and trailing edges of a clock-in pulse applied to an associated one of said chips responsive to said internal clock pulse from said associated chip.

* * * * *